(12) United States Patent
Frieden et al.

(10) Patent No.: US 6,395,057 B1
(45) Date of Patent: May 28, 2002

(54) METHOD FOR PRODUCING DIRECTLY REDUCED IRON IN A LAYERED FURNACE

(75) Inventors: Romain Frieden, Beidweiler; Thomas Hansmann, Trier; Marc Solvi, Mess, all of (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 09/581,158

(22) PCT Filed: Dec. 9, 1998

(86) PCT No.: PCT/EP98/08005
§ 371 (c)(1),
(2), (4) Date: Aug. 16, 2000

(87) PCT Pub. No.: WO99/29910
PCT Pub. Date: Jun. 17, 1999

(30) Foreign Application Priority Data

Dec. 10, 1997 (LU) .................................................. 90182
Jan. 29, 1998 (LU) .................................................. 90206
Feb. 4, 1998 (LU) .................................................. 90212

(51) Int. Cl.$^7$ ............................................. C21B 13/06
(52) U.S. Cl. ............................. 75/503; 75/505; 75/506; 75/10.38; 75/10.41; 75/484

(58) Field of Search ................... 75/503, 505, 506, 75/10.38, 10.41, 484

(56) References Cited

U.S. PATENT DOCUMENTS 2,089,782 A  *  8/1937  Carlsoson
2,333,111 A  *  11/1943  Lykken
4,702,694 A  *  10/1987  Johnson et al. .............. 432/133

FOREIGN PATENT DOCUMENTS

FR            913032       *   8/1946

* cited by examiner

Primary Examiner—Ngoclan Mai
(74) Attorney, Agent, or Firm—Oblon, Spivak, McClelland, Maier & Neustadt, P.C.

(57) ABSTRACT

A method for producing reduced iron in a layered furnace which includes several superimposed layers. Ore is continuously fed into the layered furnace, deposited on the uppermost layer, and gradually transferred to the lower layer. A reducing agent is deposited on the uppermost layer and/or layers thereunder and is reacted with the ore in order to form directly reduced iron. The directly reduced iron and reducing agent residues are discharged in the vicinity of the lowest layer of the furnace.

13 Claims, 2 Drawing Sheets

METHOD FOR PRODUCING DIRECTLY REDUCED IRON IN A LAYERED FURNACE

BACKGROUND OF THE INVENTION

1. Field of the Invention

The invention relates to a process for production of directly reduced iron in a multi-stage furnace.

2. Discussion of the Background

Production of directly reduced iron takes place in a direct reduction process by reduction of iron oxide with solid or gaseous reducing agents. A carbon carrier, which reacts with carbon dioxide and forms the reduction gas CO at higher temperatures, for example, serves as a solid reducing agent.

A process of this kind can be carried out, for example, in a rotary hearth furnace, i.e. in a furnace with a rotatable annular furnace bottom, which is lined with refractory material on the top side and is enclosed by a casing. Burners, which penetrate the casing and heat the interior of the casing to the required reaction temperature of over 1000° C., are mounted on the top of the casing.

The iron oxide is spread together with the reducing agent at a specific point on the rotary hearth and is introduced by the rotation of the rotary hearth into the interior of the casing, where it reacts with the reducing agent because of the high temperatures and is present as directly reduced iron after about one revolution of the rotary hearth. In this process iron oxide and reducing agent after charging on to the refractory lining of the rotary hearth must first be heated to the required reaction temperature before the actual reduction reaction can begin. This takes place in the area bordering on the charging zone of the rotary furnace in the direction of rotation by heat transfer from the hot waste gases of the burners to the charged materials.

Because of the low thermal conductivity of the charged materials, the heating-up phase takes a considerable time before the required reaction temperature is achieved within the charged material layers. The longer the heating-up phase, the lower is the productivity of the rotary hearth furnace, because the heating rate determines the speed of rotation of the rotary hearth.

The reduction process depends on the concentration of the reduction gases, which are in contact with the ore. However, the gas composition in the individual furnace zones can hardly be affected, because the entire furnace consists only of a single process space. In the conventional processes the diffusion of the CO from the reducing agent to the ore and $CO_2$ from the ore to the reducing agent thus cannot be affected.

From a certain degree of metallisation onwards the speed of the reduction process diminishes in such a way that the process is usually interrupted when a degree of metallisation of 85–95% is achieved. Uneconomical extension of the process time would be required to reduce the remaining oxides.

The document DE 1 225 673 relates to a process for dry reduction of iron ore in a multi-stage furnace, which has several stages one above the other. The iron ore is charged to the top stage and gradually transferred to the lower stages. In the lower stages (reduction stages) a reducing gas is fed in order to reduce the iron ore. In the upper stages the iron ore is preheated to the required reduction temperature by combustion of the rising reducing gas. Before introduction into the multi-stage furnace a solid reducing agent can be mixed with the iron ore. Part of the reducing gas from at least one of the upper reduction stages is removed and fed into at least one of the lower reduction stages.

A process for production of sponge iron in a multi-stage furnace, which has several stages one above the other, is already known from document U.S. Pat. No. 2,089,782. The iron ore is charged to the top stage and gradually transferred to the lower stages. Solid reducing agent is charged to one of the stages underneath. The iron ore is reduced in the lower stages (reduction stages). The thermal energy required for the reduction is supplied by an electrically heated melt provided under the bottom stage of the multi-stage furnace. In the upper stages the iron ore is preheated by combustion of the reducing gas rising from the reduction stages.

SUMMARY OF THE INVENTION

Consequently the task of the present invention is to propose an alternative process for production of directly reduced iron.

According to the invention this problem is solved by a process for production of directly reduced iron in a multi-stage furnace which has several stages one above the other, a high temperature prevailing in the lower stages and in which ore is continuously introduced into the multi-stage furnace and deposited on the top stage and gradually transferred to the lower stages;

reducing agent is deposited on the topmost stage and/or on one of the stages underneath it;

a gas containing oxygen is fed into the lower stages and reacts with the reducing agent to form reducing gas, the reducing gas reacting with the ore to form directly reduced iron;

the directly reduced iron is discharged together with residues of reducing agents in the area of the bottom stage of the multi-stage furnace.

An important advantage of the invention is that the process space is subdivided into different zones, the solids move continuously from the top downwards and the gases from the bottom upwards. By subdividing the process space into different zones the process conditions can be measured and controlled in the different zones or even for each stage and selectively.

Solid, liquid or gaseous reducing agents come into consideration as reducing agents.

In this process fine-grained ore can be charged and caking avoided by selective process control and continuous circulation. This is particularly advantageous, if ash-forming reducing agents are used. The separation of the ash of the reducing agent from the iron can be easily carried out. This separation can take place, for example, in the hot stage by screening. After partial cooling below 700° C. it is possible on the other hand to separate the directly reduced iron via magnetic separators from the ash and excess reducing agent. Hence this process can be used, because the continuous agitation in the multi-stage furnace prevents caking of the iron. The directly reduced iron is accordingly produced in fine-grained form and is easily picked up by the magnetic separators. The quality of the directly reduced iron obtained in this way is independent of the quantity of residues of the reducing agent.

The iron obtained can subsequently be processed into pellets or briquettes or introduced directly into a melting furnace (electric furnace etc.) and further processed.

If required, the reducing agent residues produced are burnt in burners with any unused reducing agents and the resulting heat fed to the furnace.

Accordingly a less expensive reducing agent which has a relatively high ash content can be used and/or work carried out with a relatively high excess of reducing agent.

In cases in which it is necessary to work with an excess of reducing agents, it is advantageous to treat the residues in order to separate the unused reducing agents and reuse them. This can be done e.g. by screening the residues, if the unused reducing agents are present in a sufficiently coarse form. The unused reducing agents can be introduced directly into the multi-stage furnace.

However, the charge of reducing agents can also be divided among several stages.

It is thus possible for coarse-grained reducing agents (1–3 mm) to be introduced at a higher point into the multi-stage furnace and fine-grained reducing agents (<1 mm) added at a lower point. Consequently discharge of dust with the exhaust gases is largely avoided and the reaction accelerated by the fine reducing agent particles introduced lower down.

The charging of coarser particles reduces the consumption of reducing agents, because the small particles are consumed faster via waste gases in the upper stages than is necessary for reduction of the iron ore.

According to a preferred embodiment the ore is dried and possibly preheated by the hot gases in the multi-stage furnace before it is fed into the multi-stage furnace and comes into contact with the reducing agent. The ore is preferably heated to a temperature of at least 200° C., preferably to at least 350° C. In this case the heating and drying time should not exceed 10 to 20 minutes in order to avoid sticking of the ore in a reducing atmosphere.

The ore can however be mixed with at least part of the required reducing agents before it is charged into the multi-stage furnace.

By selective addition of reducing agents in the lower stages of the furnace the reducing gases in the furnace can be adjusted to an optimum concentration, thus achieving a better degree of metallisation.

All the rising gases, including the volatile components of the reducing agents, can be completely burnt in the upper part of the furnace or outside the multi-stage furnace in the drying plant for the ore and, if appropriate, for the reducing agents, and the residual heat of the furnace's waste gases can in this way be used to maximum advantage.

The ore is continuously circulated by rakes mounted on each stage of the furnace and gradually conveyed to the underlying stage. In this way the ore is dried and heated more quickly than in conventional furnaces. The reducing agent is quickly mixed under the ore by the rakes and quickly heated to reaction temperature. Caking of the reducing agent and ore is prevented by the continuous circulation. The rate of circulation depends on many factors such as the geometry of the rakes, thickness of the layers, etc. The ore, any reducing agent present and the directly reduced iron at the stages should be circulated at least once every one to three minutes, with the result that agglomeration is largely prevented.

It is possible to inject gases containing oxygen selectively on the stage where the heat requirement must be covered by combustion of the excess process gases.

It is advantageous to use gases containing oxygen which have a temperature of at least 350° C.

A gaseous reducing agent can additionally be injected at the bottom stages of the multi-stage furnace. Consequently more complete reduction of the ore is achieved.

According to a further advantageous embodiment one or more stages in the furnace which are below the stage to which the reducing agents are introduced are heated by burners.

In order not to reduce the concentration of reducing gases in the lower part of the furnace by flue gases of the firing system, energy can also be supplied indirectly, i.e. by radiation heating.

According to another preferred embodiment gases are exhausted from the multi-stage furnace at one or more stages. These hot gases can subsequently be passed either through a $CO_2$ scrubber to reduce the gas quantity and increase the reduction potential of the gas or through an additional reactor containing carbon, so that the carbon dioxide present in the hot gases reacts with the carbon to form carbon monoxide according to the producer-gas equilibrium and the reduction potential of the gas is thus increased. The gases enriched by carbon monoxide are subsequently returned to the multi-stage furnace.

If necessary, additives are introduced to one of the stages under the stage where the reducing agents are introduced.

In such a case it is advantageous to exhaust gases at a stage above the stage at which additives are introduced.

According to a preferred embodiment gases are exhausted from the multi-stage furnace below a specific stage and subsequently re-injected into the furnace above this stage. Iron oxide dust containing carbon and heavy metal can be introduced into the furnace at this stage. The heavy metal oxides are reduced there, the heavy metals volatilise and the gases produced at this stage are then separately exhausted.

To achieve a further increase in productivity the multi-stage furnace can be operated at a specific excess pressure. In contrast to a rotary furnace, which is sealed by water seals with a diameter of about 50 m, this can be realised very easily in a multi-stage furnace, which has only small seals on the drive shaft. In such a case pressure locks for the feed and removal of material must be provided.

BRIEF DESCRIPTION OF THE DRAWINGS

An embodiment of the invention will now be described below on the basis of the enclosed figures.

DESCRIPTION OF PREFERRED EMBODIMENTS

Figure 1:
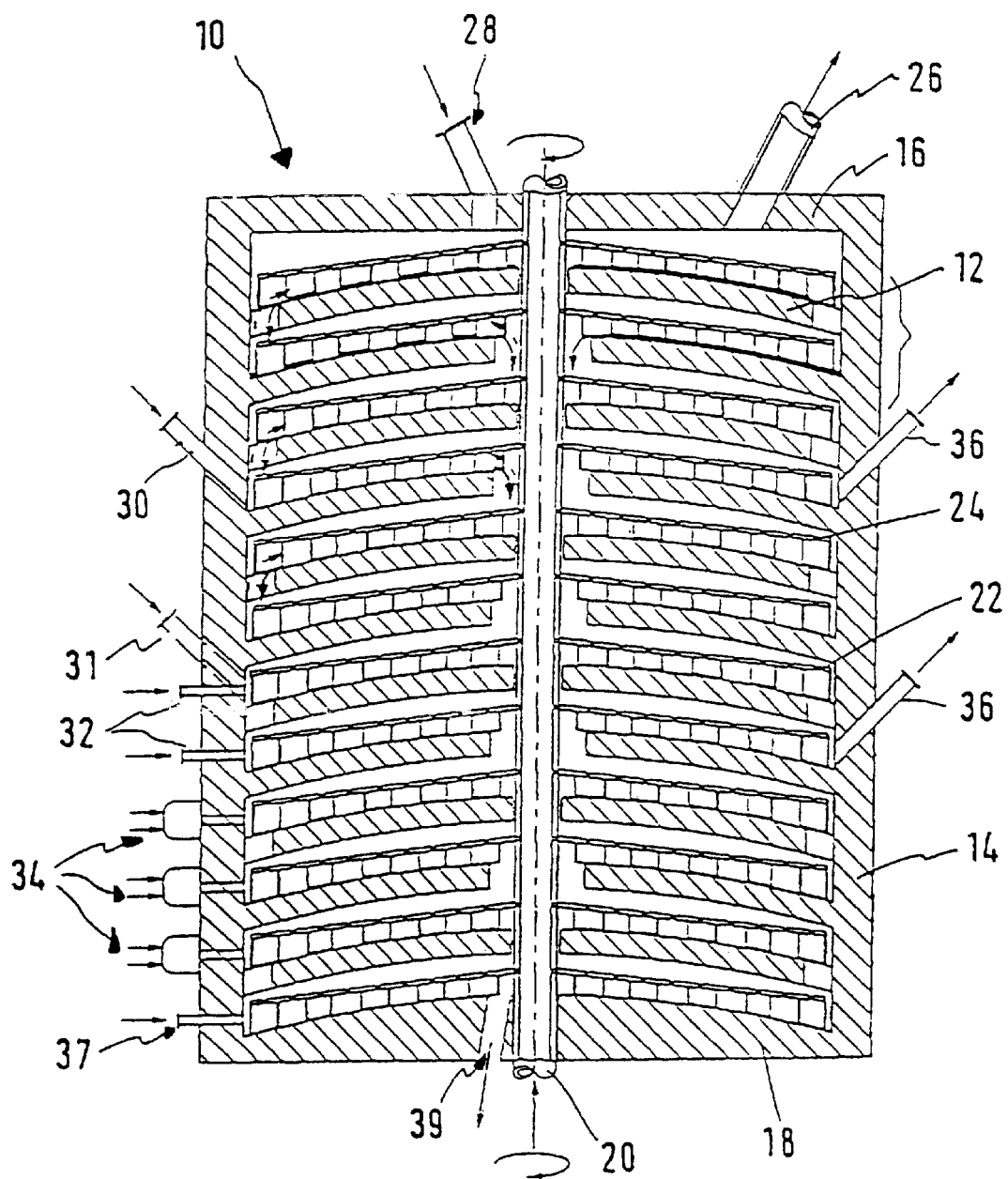
FIG. 1: shows a section through a multi-stage furnace for production of directly reduced iron.

Fig. 1 shows a section through a multi-stage furnace 10, which has several—in this case eleven—stages 12 one above the other. These self-supporting stages 12 and the casing 14, cover 16 and bottom 18 of the furnace are made from refractory material.

A shaft 20, on which rakes 22 projecting over the respective stages are secured, is mounted in the centre of the furnace.

The rakes 22 are designed in such a way that they circulate the material on a stage from the inside outwards and then on the underlying stage from the outside inwards in order to convey the material from the top downwards through the furnace.

The ore can be charged into the furnace either separately or together with the reducing agents. In so doing, the ore can be dried outside the furnace and mixed with the reducing agents, the mixture then being deposited on the topmost stage, or the ore and the reducing agents can be charged into the furnace separately and brought into contact with the reducing agents on the first stage and/or on one of the underlying stages.

After the ore has been brought to the first stage it is circulated by the rakes 22 and conveyed to the edge of the stage, whence it falls through several openings provided for the purpose to the underlying stage. From there the ore is conveyed to the centre of the stage and then falls on to the underlying stage. During this time the ore is heated by contact with the stage and the rising hot gases to approximately 600° C. to 1000° C.

The shaft 20 and the rakes 22 are air-cooled and openings 24, through which the air can flow into the interior of the furnace and can be used there for after-combustion, are provided on the rakes.

A stack 26, through which the gases can be evacuated from the furnace, and an opening 28, through which the ore can be deposited on the top stage, are provided in the cover 16 of the furnace 10.

At least one inlet opening 30, through which the reducing agents can be introduced into the furnace, is provided in the side walls of the furnace 10—normally in the upper third. These reducing agents may be present in both gaseous and liquid or solid form. The reducing agents are carbon monoxide, hydrogen, natural gas, petroleum and petroleum derivatives or solid carbon carriers such as lignite coke, petrol coke, blast furnace dust, coal or the like. The carbon carrier, which is introduced at a stage lower down the furnace 10, is mixed with the heated ore there by the rakes 22. The iron oxide present in the ore is gradually reduced to metallic iron by the high temperature and the presence of carbon monoxide during transport through the multi-stage furnace 10.

Nozzles 32, through which air or another gas containing oxygen can be fed into the furnace 10, are provided in the lower half of the side wall for injection of hot (350° C. to 500° C.) gases containing oxygen. As a result of the high temperatures and the presence of oxygen some of the carbon burns to carbon dioxide, which in turn reacts with the carbon present in excess and is converted to carbon monoxide. The carbon monoxide finally reduces the iron oxide to metallic iron. As this reaction is predominantly endothermal, it is logical to mount in the lower part of the furnace burners 34, which ensure a uniformly high temperature in the bottom stages of the furnace. Gas or pulverised coal burners can be used in this case.

These burners 34 can be fired with gas or pulverised coal with air for preheating and/or additional heating. As a result of the quantitative ratio between oxygen and fuel an additional reducing gas can be produced or in the case of excess air after-combustion of the process gases is achieved. In the case of pulverised coal firing an excess of carbon monoxide may be produced in the burner. With external combustion chambers the ash of the burnt coal can be prevented from entering the furnace and mixing with the directly reduced iron. The temperatures in the combustion chambers are selected in such a way that the slag produced can be tapped in liquid form and disposed of in vitrified form. The production of carbon monoxide reduces the consumption of solid carbon carriers in the furnace 10 and thus also the ash content in the finished product.

In the side wall of the furnace openings 36, through which hot gases can be removed from the furnace, are provided at the height of the middle stage.

Provision is made in the last or last two stages for feed of a gaseous reducing agent, e.g. carbon monoxide or hydrogen, through special nozzles 37. The reduction of the ore can be completed in this atmosphere with increased reduction potential.

The directly reduced iron is subsequently discharged together with the ash of the reducing agents through the outlet 39 in the bottom 18 of the furnace 10.

It is possible to control reduction of the ore accurately and carry out the process under optimum conditions by controlled feed of solid, liquid and gaseous reducing agents and gases containing oxygen at different points of the multi-stage furnace 10 and the facility for exhausting excess gases at critical points.

Figure 2:
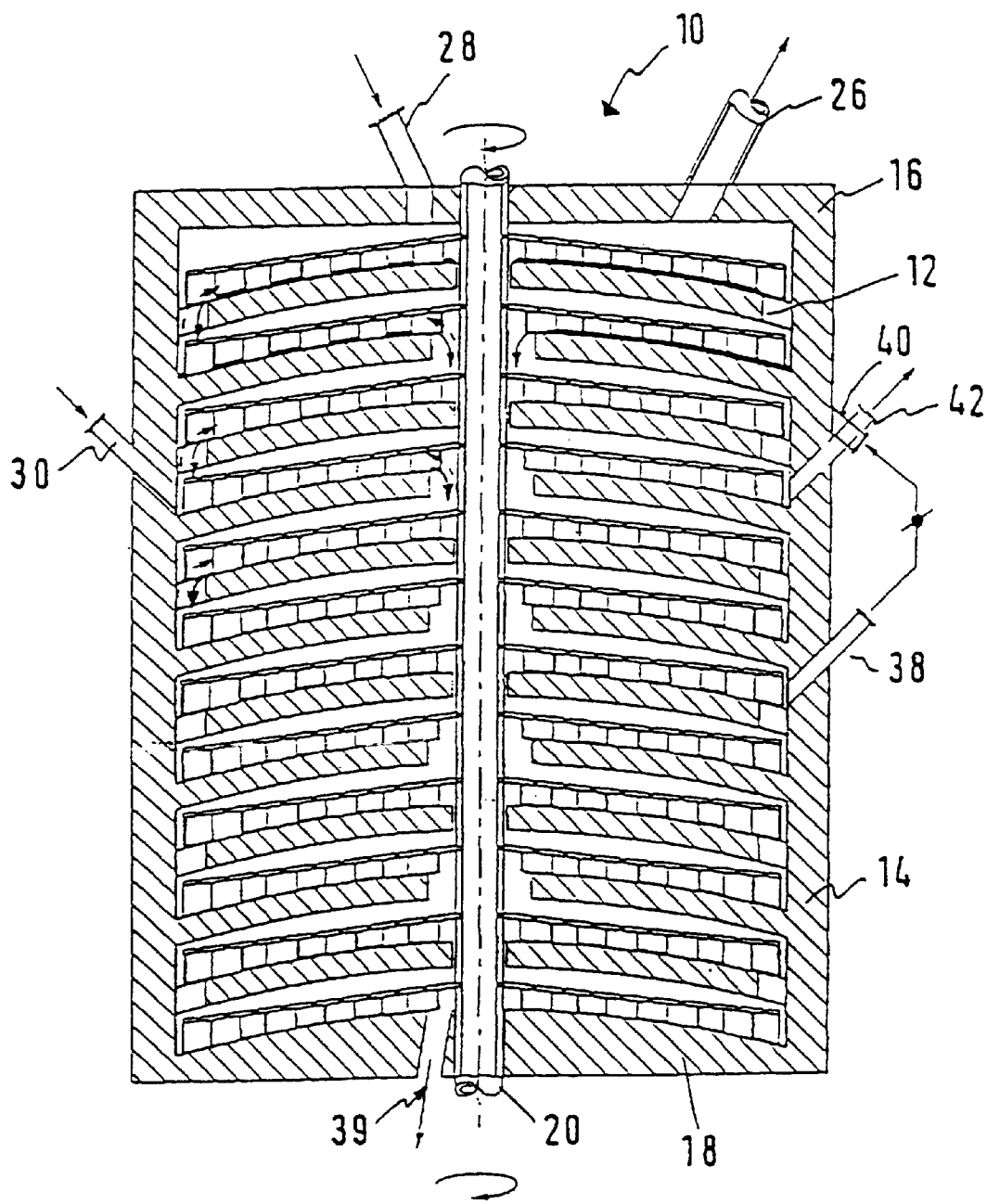
FIG. 2: a section through an alternative type of a multi-stage furnace for production of directly reduced iron.

FIG. 2 shows a multi-stage furnace 10 very similar to that in FIG. 1.

This furnace 10 also permits the use of problematical waste such as contaminated dust containing iron for the production of directly reduced iron.

For example, contaminated dusts containing iron oxide from electric or converter steelmaking plants, which indeed contain hardly any carbon, can be fed together with the ore through the opening 28 in the cover 16 into the multi-stage furnace 10. Dusts containing iron oxide and large quantities of carbon such as residues containing oil from rolling mills or dust from the waste gas scrubbers of blast furnaces can be fed through a special opening 31 into the furnace 10.

As these products containing carbon and iron oxide are often contaminated by heavy metal, a large proportion of the gases flowing upwards in the furnace can be exhausted from the furnace 10 below the stage on which the iron oxide dusts containing carbon are deposited, by an exhaust connection piece 38 in the side wall and re-injected into the furnace 10 through at inlet 40 above this stage. Consequently the gas quantity on the stage to which the iron dust is introduced is small. The heavy metals present in the iron dust are reduced immediately after their introduction into the furnace and volatilise. They can then be exhausted from the furnace 10 in a relatively small gas quantity on this stage through an outlet 42 in the side wall. The small volume of gas with a relatively high heavy metal content can then be cleaned separately. As a result of the small waste gas quantities the gas flow rates on the corresponding stages are low and only small quantities of dust are thus discharged with the waste gas. Consequently an extremely high heavy metal concentration in the waste gas results.

The iron oxide present in the dusts is reduced with the ore feed into the furnace to iron.

What is claimed is:

1. A process for production of directly reduced iron in a multi-stage furnace having a plurality of stages in which a higher temperature prevails in lower stages of the plurality of stages, said process comprising the steps of:
   continuously introducing ore into the multi-stage furnace on a top stage of the plurality of stages;
   gradually transferring the ore to the lower stages;
   depositing at least one of solid and liquid reducing agents on at least one of the top stages and one of stages underneath the top stage;
   feeding a gas containing oxygen through a bottom half portion of a side wall of the multi-stage furnace into the multi-stage furnace;
   reacting the gas containing oxygen with part of the at least one of solid and liquid reducing agents to form a reducing gas;
   reacting the reducing gas with the ore to form directly reduced iron; and
   discharging the directly reduced iron together with residues of the at least one of solid and liquid reducing agents from a bottom stage area of the multi-stage furnace.

2. A process according to claim 1, further comprising heating at least one lower stage of the plurality of stages by burners arranged in a wall of the multi-stage furnace.

3. A process according to claim 1, further comprising providing excess pressure for carrying out the process.

4. A process according to claim 1, wherein the introducing step comprises introducing the at least one of solid and liquid reducing agents to different stages of the plurality of stages in the multi-stage furnace.

5. A process according to claim 1, further comprising introducing an excess amount of the at least one of solid and liquid reducing agents into the multi-stage furnace.

6. A process according to claim 1, wherein the introducing step comprises introducing a coarse-grained reducing agent into higher stages of the plurality of stages and a fine-grained reducing agent into lower stages of the plurality of stages in the multi-stage furnace.

7. A process according to claim 1, further comprising feeding a gaseous reducing agent through nozzles in one of a last stage and last two stages of the plurality of stages.

8. A process according to claim 1, further comprising separating unused reducing agents from the residues after the discharging step.

9. A process according to claim 8, further comprising burning the unused reducing agents in external combustion chambers; and feeding resulting heat to the multi-stage furnace.

10. A process according to claim 1, further comprising indirectly heating at least one stage of the plurality of stages.

11. A process according to claim 1, further comprising introducing one of iron oxide dust and sludge containing heavy metal oxides into the multi-stage furnace, thereby reducing oxides and volatilizing heavy metals in the one of iron oxide dust and sludge.

12. A process according to claim 11, further comprising exhausting the heavy metals volatilized separately at a stage where the heavy metals are volatilized.

13. A process according to claim 7, wherein the gaseous reducing agent comprises one of carbon monoxide and hydrogen.

* * * * *